United States Patent [19]

Toyoda et al.

[11] 4,236,804
[45] Dec. 2, 1980

[54] LENS INFORMATION INTRODUCING DEVICE HAVING CORRECTED EXTRANEOUS LIGHT

[75] Inventors: Kenji Toyoda, Kawasaki; Jun Shimomura, Tokyo, both of Japan

[73] Assignee: Nippon Kogaku K.K., Tokyo, Japan

[21] Appl. No.: 59,037

[22] Filed: Jul. 19, 1979

[51] Int. Cl.³ .................. G03B 7/093; G03B 17/00; G03B 17/18

[52] U.S. Cl. .................. 354/286; 354/23 D; 354/289

[58] Field of Search .............. 354/23 D, 50, 51, 234, 354/286, 289

[56] References Cited

U.S. PATENT DOCUMENTS 3,840,298  10/1974  Okuno ................. 354/289 X
3,928,858  12/1975  Sakurada et al. ....... 354/23 D
4,104,649  8/1978  Tanaka et al. ......... 354/289

*Primary Examiner*—Michael L. Gellner
*Attorney, Agent, or Firm*—Shapiro and Shapiro

[57] ABSTRACT

A lens information introducing device in a camera comprises a photoelectrically legible digital code pattern provided on a lens, optical means for introducing the code pattern into a camera body and imaging the same at a predetermined position, photoelectric converter means disposed at the predetermined position for photoelectrically converting the image of the code pattern formed by the optical means, and shaping means for comparing the photoelectrically converted signal by the photoelectric converter means with a standard signal and generating the lens information indicated by the code pattern as a digital signal.

8 Claims, 7 Drawing Figures

FIG. 1
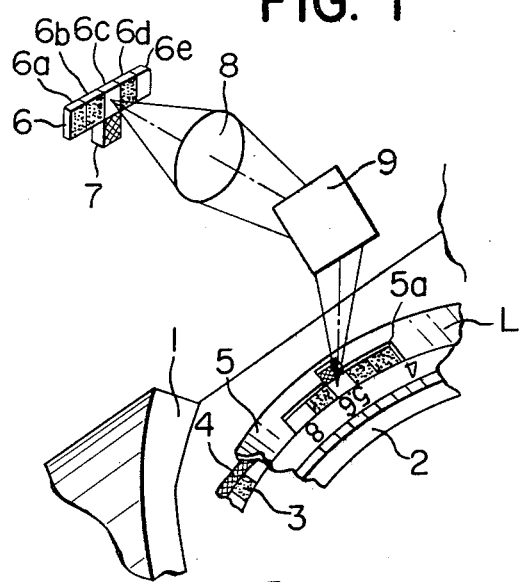
FIG. 2
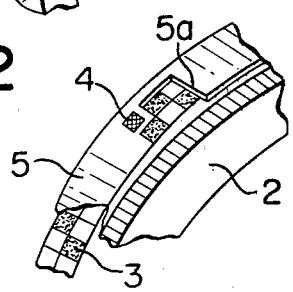
FIG. 4C
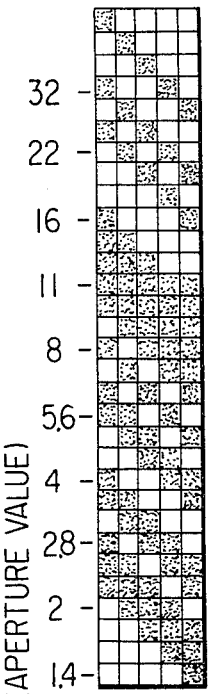
FIG. 4A
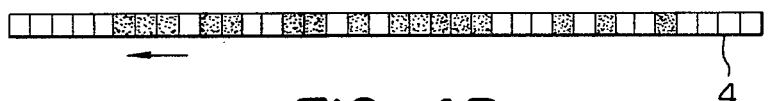
FIG. 4B
FIG. 5
1.4 2 2.8 4 5.6 8 11

LENS INFORMATION INTRODUCING DEVICE HAVING CORRECTED EXTRANEOUS LIGHT

BACKGROUND OF THE INVENTION

1. Field of the Invention

This invention relates to a device for introducing into the camera body side the information obtained by displacement of a movable member such as, for example, the aperture ring or the distance ring of a lens.

2. Description of the Prior Art

As the means for suitably quantizing a set value such as aperture, distance or the like of a lens and transmitting the same to a camera body, there is known one in which ON-OFF switches corresponding in number to the number of bits necessary for the transmission of the information are provided on the lens side and the connection between the camera body and the lens depends on an electrical connection by connecting terminals. However, such means involves much labor in the wiring work and in securing electrical reliability.

A photoelectric coupling system would occur to mind for the information transmission between the camera body and the lens. That is, the lens information is represented by a pattern provided on the lens and this is photoelectrically read. However, such system offers the following problem. Even for the same lens information, the output level of a photoelectric element is varied in accordance with the variation in brightness of the pattern illuminating light, so that it is difficult to detect the lens information from the output of the photoelectric element.

SUMMARY OF THE INVENTION

It is an object of the present invention to overcome the above-noted disadvantage and to provide a lens information introducing device provided with a stable lens information detecting function for variation in the extraneous light.

The invention will become fully apparent from the following detailed description thereof taken in conjunction with the accompanying drawings.

BRIEF DESCRIPTION OF THE DRAWINGS

FIG. 1 shows the photoelectric coupling system between a lens to which the present invention pertains and a camera body.

FIG. 2 shows another example of the reference information generating pattern according to the present invention.

FIGS. 4 and 5 show specific examples of the binary coded code pattern.

DESCRIPTION OF THE PREFERRED EMBODIMENTS

Figure 3:
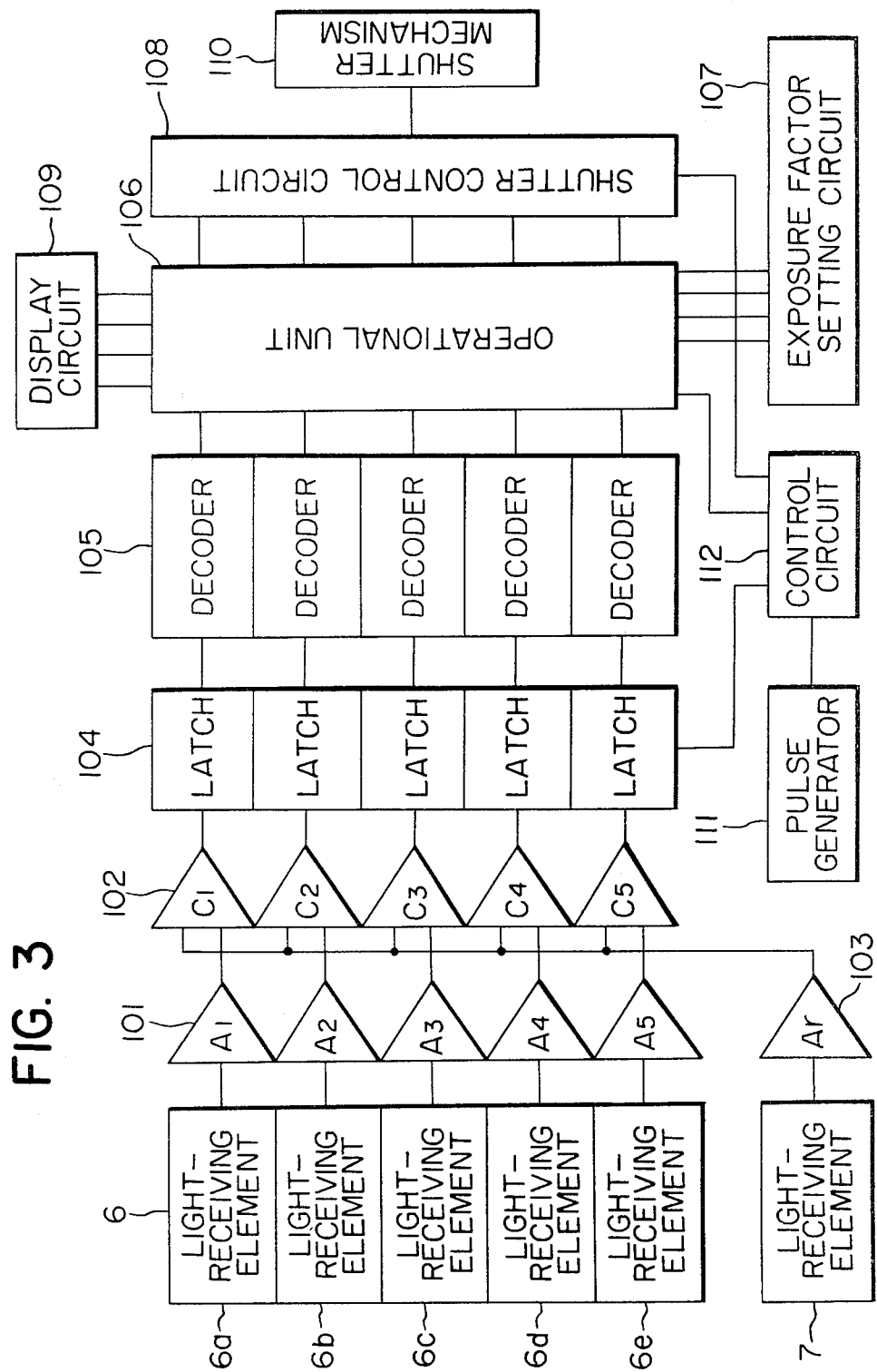
FIG. 3 is a block diagram showing the electrical signal processing system according to the present invention.

Referring to FIG. 1, it shows a photoelectric coupling system between a lens and a camera body which forms the basis of the present invention. In FIG. 1, the camera body 1 has an interchangeable lens L attached thereto, and an aperture ring 2 for setting the aperture value is rotatably provided relative to the camera body 1. A code pattern 3 for quantizing the aperture information and a reference information generating pattern 4 are also rotatable in response to rotation of the aperture ring 2. The code pattern 3 comprises binary coded stripes of light and dark, and the arrangement of the light and dark is such that a set of stripes (in FIG. 1, five stripes or five bits) corresponds to an aperture set value. The code pattern may conveniently be a pattern of M-sequences (maximal length sequences) or improved M-sequences which is well-known in the technical field of a displacement encoder shown in FIGS. 4(A) and 4(B), for example, or a numerical pattern as shown in FIG. 5 (in the present example, JIS-C6250). Since the former is a one-track code pattern, it is not only spatially advantageous but also it can be readily added to the existing lens as by alumite printing, and the latter is the best suited for use in a small lens on the outer peripheral surface of which both the code pattern and the aperture value cannot be provided. The code pattern may of course be other pattern which is photoelectrically legible. The code pattern of FIG. 1 is an example using the improved M-sequences, and if the code pattern shown in FIG. 4(B) is moved for one bit each in the direction of arrow correspondingly to the aperture set value of the aperture ring, a light-receiving element will receive a pattern corresponding to the set aperture value as shown in FIG. 4(C). The case of FIG. 1 is a case of the aperture value 5.6.

The reference information generating pattern 4 is, for example, grey and has a suitable diffuse reflection factor, and is juxtaposed with the code pattern 3 substantially over the entire area of the track of the code pattern 3. A fixed ring 5 has an opening portion 5a through which five bits of pattern of the code pattern 3 and the reference information generating pattern 4 are exposed. The reference information generating pattern 4 may be fixed like a pattern 4' shown in FIG. 2. In FIG. 2, the pattern 4' is provided on the fixed ring 5.

Disposed in front of the pentaprism of the camera body 1 is an optical system 8, 9 for covering five bits of light and dark pattern and pattern 4 and projecting the conjugate image thereof onto the light-receiving surface of light-receiving elements 6, 7. Designated by 8 is an image forming lens, and denoted by 9 is a mirror for bending the patterns 3, 4 exposed through the opening portion 5a toward the image forming lens 8. The light receiving element 6 has its light-receiving surface divided into five segments, each of which independently produces a photoelectric output corresponding to the light and dark of the pattern projected thereon. The light-receiving element 7 produces a photoelectric output corresponding to the brightness of the pattern 4. The outputs of these light-receiving elements 6, 7 are varied in accordance with the brightness of the extraneous light, as already described.

The outputs of the light-receiving elements 6, 7 are processed by a processing circuit shown in FIG. 3, and may be used for the exposure control and the display. In FIG. 3, the outputs of the segments 6a–6e of the light-receiving element 6 which receives the code pattern are applied to a comparator circuit 102 through a buffer amplifier 101. The output of the light-receiving element 7 which is the reference information generated from a buffer amplifier 103 is applied as the standard input to the comparator 102. Thereupon, the standard input to the comparator 102 follows the brightness of the extraneous light, so that stable comparison operation can be effected for the outputs of the segments 6a–6e whose output levels are being varied in accordance with the variation in the extraneous light. That is, if the entire output level of the segments 6a–6e rises or drops in accordance with the brightness of the extraneous light, the standard input also rises or drops, thus preventing any wrong comparison from being effected.

The digital output H(1) or L(0) obtained by this comparator circuit 102 is temporally memorized by a latch 104, and then applied to a decorder 105. The decoder 105 converts special code of the code pattern into a binary code which is convenient for the operation and control. An operational unit 106 effects a predetermined operation from the output of the decoder 105 and the output of an exposure factor setting circuit 107, and applies the result of the operation to a shutter control circuit 108 and a display circuit 109. Designated by 110 is a shutter mechanism, 111 a pulse generator circuit, and 112 a circuit for controlling the latch 104, the operational unit 106 and the shutter control circuit by the pulse output from the pulse generator circuit 111 and the signals from various mechanisms in the camera body. The elements 106 to 112 may be of the known constructions.

In FIGS. 1 and 2, the light-receiving element 7 receives the light from the reference patterns 4, 4' adjacent to the code pattern 3 and this is excellent in accurately grasping the variation in the brightness on the code pattern 3, whereas the light-receiving element 7 is not limited thereto but may receive the extraneous light from the direction of the optic axis of the lens.

According to the present invention, as has hitherto been described, in a device for photoelectrically transmitting the lens information to the camera body side, it is possible to secure a stable operation for the variation in the brightness of the code pattern illuminating light.

We claim:

1. A lens information introducing device in a camera, comprising:
    a digital code pattern provided on a lens, said pattern being photoelectrically legible;
    optical means for introducing said code pattern into a camera body and imaging the same at a predetermined position;
    photoelectric converter means disposed at said predetermined position, said photoelectric converter means being effective to photoelectrically converting the image of said code pattern formed by said optical means; and
    shaping means for comparing the photoelectrically converted signal by said photoelectric converter means with a standard signal and producing the lens information indicated by said code pattern as a digital signal, said standard signal depending on the brightness of illuminating light onto said code pattern.

2. The device according to claim 1, wherein said shaping means has a photoelectric converter device for photoelectrically converting the light corresponding to the illuminating light onto said code pattern, and said standard signal is obtained as the output signal of said photoelectric converter device.

3. The device according to claim 2, wherein said digital code pattern has n bits of light and dark patterns corresponding to the lens information, said photoelectric converter means has photoelectric converting elements corresponding to said n bits, and said shaping means compares the photoelectrically converted signals of said photoelectric converting elements with said standard signal and produces the lens information as n bits of digital signal.

4. The device according to claim 3, wherein the lens further has a correction pattern for said standard signal adjacent to said n bits of pattern, and said photoelectric converter device produces a signal corresponding to the brightness of said correction pattern.

5. The device according to claim 4, wherein said digital code pattern and said correction pattern are provided on the outer periphery of said lens, and said photoelectric converter device photoelectrically converts the images of said patterns illuminated by extraneous light.

6. The device according to claim 5, wherein said digital code pattern is provided on a movable member such as an aperture ring or a distance ring, and the imaged pattern by said optical means is variable by displacement of said movable member.

7. A lens for use in a camera body having an optical system designed to image a predetermined position of the outer periphery of the lens in the camera body, and a processing device for reading the lens information by a signal from photoelectric converter means provided at the image forming position of said optical system, said lens including:
    a digital code pattern provided at the predetermined position of the outer periphery of said lens, said pattern representing the lens information; and
    a correction pattern provided adjacent to said digital code pattern.

8. The lens according to claim 7, wherein said digital code pattern is provided on a movable member such as an aperture ring or a distance ring.

* * * * *